Feb. 24, 1959 V. G. SHARPE ET AL 2,874,553
FREEZING DEVICE
Filed Jan. 14, 1957

INVENTOR.
Verlos G. Sharpe
BY Jost S. Sucro
Edwin S. Dybvig
Their Attorney

United States Patent Office 2,874,553
Patented Feb. 24, 1959

2,874,553

FREEZING DEVICE

Verlos G. Sharpe and Jost Sergé Sucro, Dayton, Ohio, assignors to General Motors Corporation, Detroit, Mich., a corporation of Delaware Application January 14, 1957, Serial No. 634,020

11 Claims. (Cl. 62—367)

This invention relates to freezing devices of the tray and grid type employed in household refrigerators.

With the advent of unitary freezing device structures of the type including a tray and grid walls movably interlocked together and secured in the tray against detachment therefrom and wherein any one of a plurality of such unitary devices are removed from a freezing compartment in a refrigerator cabinet and invertedly supported on an ice block releasing or ejecting apparatus common to all of the freezing devices in the refrigerator a problem has arisen. In this type of unitary freezing device a part of a grid wall actuating member must register with and be removably received by a part of the ice block ejecting apparatus in order that a force multiplying leverage mechanism or the like mounted on the common apparatus can be operated to effect release or ejection of ice blocks from a unitary freezing device structure. It has been discovered that if unitary freezing devices of this character are not provided with some means to insure the return to and holding of grid walls in their normal inclined position with respect to the vertical within the tray then these walls may be shifted out of their normal ice block freezing position during filling of the tray with water or during transportation of the device from a kitchen sink to the freezing chamber of a refrigerating cabinet. This shifting of the grid walls in such freezing devices also moves the receiving part of a grid wall actuating member thereof out of its normal position and said part will not, after ice blocks are frozen in a unitary freezing device, register with the part of the mechanism on the ice releasing apparatus when the freezing device is placed in association therewith. Our present invention is specifically directed to the provision on a unitary tray and grid type freezing device structure of means whereby this problem is overcome to thus eliminate objections and difficulties encountered by users and to reduce service calls to a minimum.

An object of our invention is to provide an improved unitary freezing device structure of the tray and grid type for use in household refrigerators.

Another object of our invention is to provide means in a freezing device of the type including a tray and a movable walled grid locked therein against detachment therefrom which will return the movable grid walls to their normal ice block freezing position in the tray and hold them in such position after ice blocks have been released or ejected from the device.

It is a further object of our invention to accomplish the foregoing object in a positive, simplified and inexpensive manner so as to increase the utility of a unitary freezing device and render same practical.

A still further and more specific object of our invention is to provide a unitary freezing device structure with a single spring forming a part of a means which locks a movable walled grid in a tray and which spring is rendered effective automatically in response to moving walls of the grid, during the act of releasing ice blocks from the device, for thereafter returning the walls to their normal ice block freezing position.

Further objects and advantages of the present invention will be apparent from the following description, reference being had to the accompanying drawings, wherein a preferred form of the present invention is clearly shown.

Figure 1:
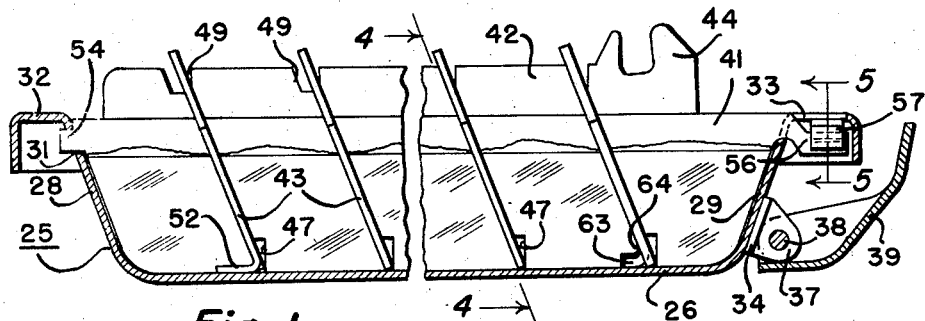
Figure 1 is a broken view of an elongated unitary freezing device with the tray thereof in section and having our invention embodied therein.

Before proceeding with the description of our present invention it is desired to point out that our invention relates specifically to unitary freezing device structures including a tray and a movable walled grid locked therein against detachment therefrom of the type disclosed and more fully described in the Verlos G. Sharpe application Serial No. 597,213, filed July 11, 1956, entitled Ice Block Harvesting Device and assigned to the assignee of this application, as distinguished from conventional freezing devices wherein the grid is removable as a unit from a tray by operation of a hand operated lever thereon. The unitary freezing device structure herein disclosed differs slightly from that shown in the application just referred to in order to carry out the objects of our present invention and such differences will be herein described in detail. Referring to the drawings, for illustrating the present invention, we show in Figure 1 thereof a freezing device generally represented by the numeral 25 including an elongated sheet metal pan or tray 26 provided with a bottom, sides 27 diverging upwardly and outwardly therefrom and ends 28 and 29. The rear end 28 of tray 26 is provided with the opening 31 adjacent a rim 32 extending around or bordering the top of tray 26 and the other or front end 29 of the tray is cut or notched out as at 33. The rim 32 in the present disclosure is made wider, particularly at the front end of the freezing device 25, than the rim around the tray in the application above identified for the purpose of accommodating or receiving thereunder a spring means to be hereinafter described. Notch 33 extends along a part of rim 32 and also downwardly therefrom to a short distance therebelow. A pair of brackets 34 are spot welded to the front end of tray 26 one on either side of notch 33 and each is provided with an outwardly projecting ear 37. Ears 37 are each provided with an opening or hole which receives a rivet 38 extending through a leg of a U-shaped handle or lever 39. Handle 29 serves as a cam for prying the bottom of tray 26 upwardly loose from a freezing support or shelf when a device 25 is to be removed from a refrigerator cabinet as is common in the art. A movable walled grid is locked in the tray 26 against removal or detachment therefrom to provide the unitary freezing device structure 25 as distinguished from prior art devices where the grid is removable from the tray in order to harvest ice blocks. The grid in device 25 includes a two-part central metal partition and a plurality of spaced apart substantially inflexible metal walls extending transversely thereacross for dividing the interior of tray 26 into rows of compartments in which water is to be frozen into separated ice blocks. The central partition of the grid comprises a lower longitudinal wall or part 41 and a separate substantially coextensive upper actuating wall or member 42 disposed in vertical alignment therewith and adapted to be moved back and forth therealong. The plurality of spaced apart transverse or cross walls 43 are loosely mounted on or movably interlocked with longitudinal wall 41 of the partition at their bottom edges and are loosely mounted on or movably interlocked with actuating member 42 adjacent their upper edges. The loose interlocking of walls 43 on the central partition is such that they may be swung or tilted relative thereto and to the tray 26. Cross walls 43 are normally disposed or lie in an acute angular plane with respect to the vertical and are adapted to be tilted toward the vertical and preferably beyond a vertical plane when actuating member 42 is moved in one direction lengthwise along wall 41. Member 42 is provided with a hook-like end 44 at the front of device 25 and the location of this end 44 thereof with respect to other portions of the device after ice blocks are formed in the unitary freezing device is highly important. By virtue of the fact that cross or transverse walls 43 are normally inclined with respect to the vertical the ice block compartments are, in one vertical cross sectional contour or area therethrough of a parallelogram shape and when the walls 43 are tilted toward the vertical, to break bonds between the ice blocks and their compartment walls, these ice block compartments are enlarged in a direction intermediate the cross walls. This feature is old in the art being fully described and illustrated in the Donald H. Reeves Patent #2,219,079 dated October 22, 1940, and in other patents and is essential to the success of releasing ice blocks from a unitary freezing device structure wherein the grid cannot be detached from the tray thereof.

Figures 4, 5:
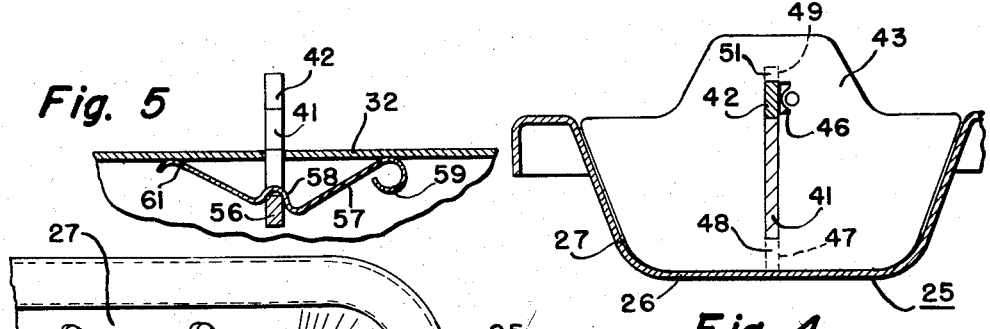
Figure 4 is a sectional view taken on the line 4—4 of Figure 1 showing a movable interlock between parts of the grid.
Figure 5 is an enlarged fragmentary sectional view taken on the line 5—5 of Figure 1 showing a spring interposed between a portion of the grid locked in the tray and a part of the tray of the unitary freezing device.
Figure 2:
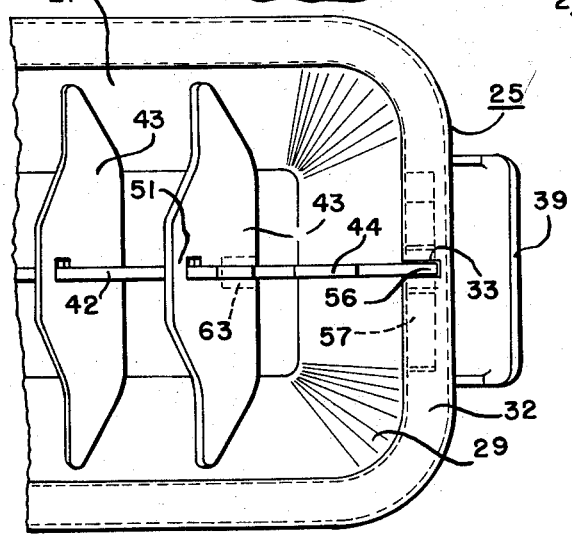
Figure 2 is a fragmentary top view of one end of the freezing device disclosed in Figure 1.

Cross or transverse grid walls 43 each have an elongated key-hole shaped opening 46 therein (see Figure 4) through which the walls 41 and 42 of the central partition extend. Longitudinal wall part 41 of the partition has a series of notches 47 cut in its bottom edge to loosely receive a web portion 48 at the bottom margin of cross walls 43. The actuating wall or member 42 has notches 49 of varying widths relative to one another cut therein and suitably spaced apart along the upper edge thereof to receive a continuous or web portion 51 of cross walls 43. The notches 49 in member 42 are arranged so that the edge portion thereof engages the cross or transverse walls or partitions 43 one after the other in succession from the front end to the rear end of a freezing device 25, when member 42 is moved in one direction forwardly of the unitary freezing device structure, to progressively tilt the walls 43 and to progressively enlarge the ice block compartments as is conventional in the art. The method of assembling the grid walls 41, 42 and 43 into interlocking relative movable association with one another is now well known to those skilled in the art and needs no explanation herein. The cross wall at the front end of device 25 is thicker than others thereof and the cross wall at the rear end of the device is provided with spaced apart lips 52 at its lower edge to facilitate ejection of the ice blocks from the two compartments at the back of the unitary freezing device. Any suitable means, such as staking a side wall of the key-hole shaped opening 46 in walls 43 (see Figure 4), may be utilized to keep the walls 41 and 42 in vertical alignment with one another when relative movement occurs between them. Longitudinal wall 41 of the central partition of the grid is provided at its rear end with a projection 54 fitting in the closed walled opening 31 of tray end wall 28. The other or front end of wall 41 is provided with a downwardly and laterally extending projection 56 which is slid into the notch 33 at the front end 29 of device 25. A strip or leaf spring 57 having a bend 58 intermediate ends 59 and 61 thereof, is forcibly interposed between the underside of rim 32 on tray 26 and the top of projection 56 on longitudinal wall 41 (see Figure 5). This spring or spring means 57 normally biases the lower edge of the grid walls 41 and 43 into contact with the tray bottom to hold the transverse walls in their inclined position and is a part of the means which locks the grid in the tray and also or furthermore serves another purpose to be presently described. Since the walls 41, 42 and 43 are all movably interlocked together and the grid is locked in the tray 26 against detachment or removal therefrom by the projections 54 and 56 on wall 51 fitting in the openings 31 and 33 a unitary freezing device structure is provided. In accordance with our invention the forwardmost or thicker transverse wall 43 is provided with a lip 63 bent laterally from its lower edge centrally thereof and which extends under a cut away shoulder 64 in the bottom of longitudinal wall 41. This lip 63 serves as a cam or cam means for moving a part of the grid at one or the front end of device 25 relative to or away from the bottom of tray 26 when the grid walls are moved with respect to one another and this movement of the one part of the grid and particularly projection 56 on wall 41 compresses the spring 57 to momentarily increase its biasing effect by storing up energy therein.

Figure 3:
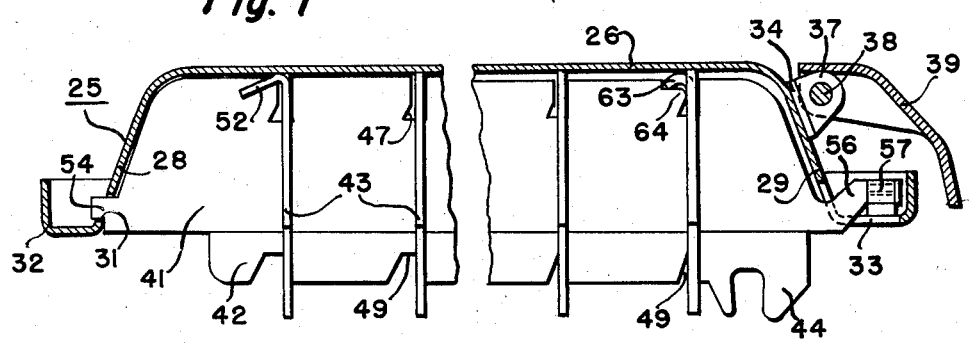
Figure 3 is a broken view similar to Figure 1 showing the freezing device inverted with its grid walls moved out of their normal position into an ice block releasing position illustrating the manner in which a spring means incorporated in the device is rendered effective.

The normal biasing of the grid walls 41 and 43 into contact with the bottom of tray 26 of a device 25 by spring 57 serves to hold the cross walls 43 in their inclined position to prevent shifting of these walls out of such position while the tray is being substantially filled with water and during transportation of the water filled device 25 from the sink to the freezing chamber of a refrigerator cabinet. When a unitary freezing device 25 together with ice blocks therein is removed from the refrigerator and invertedly supported on an ice releasing or ejecting apparatus such, for example, as that disclosed in the copending application hereinbefore identified and the actuating member 42 is moved lengthwise or forwardly of the device, with respect to longitudinal wall 41, member 42 engages the transverse or cross walls 43 one after the other in succession and progressively tilts these cross walls toward or past the vertical to break bonds between ice blocks and their compartment walls and to release or eject the ice blocks from the freezing device. Movement of member 42 and the tilting of the forwardmost cross wall 43 rotates lip 63 thereon against the shoulder 64 on longitudinal wall 41 to cam one end of this wall at the one or front end of device 25 a short distance away from the bottom of tray 26 (see Figure 3). Movement of the one end of the grid away from the bottom of tray 26 also causes the projection 56 on longitudinal wall 41 to compress spring 57 for increasing its biasing effect and to store up energy therein. The initial tilting of walls 43 breaks a bond between ice blocks in the device and their compartment walls and further swinging of the walls into a substantially vertical plane enlarges the compartments and causes ice blocks to fall or be released therefrom. After release of ice blocks from a device 25 supported on an ice ejecting apparatus of the character shown in the Sharpe application hereinbefore identified and removal of the device therefrom the energy stored up in spring 57 is applied to the projection 56 or longitudinal wall 41 and the force of this energy then moves the lower edge of grid wall part 41 and consequently walls 43 back into biasing contact or abutment with the bottom of tray 26. This movement causes the shoulder 64 at the lower edge of longitudinal wall 41 to bear against and apply force to the lip 63 on the forward cross wall 43 and such force causes the lower edge of forward wall 43 to pivot about the bottom of tray 26, within notch 47, to swing this wall in a direction opposite the direction in which it was tilted. Web portion 51 of this forward cross or transverse wall 43 engages, during swinging thereof, a side of notch 49 in actuating member 42 and shifts the member 42 rearwardly of the device 25 whereupon a side of other notches 49 engages the web 51 on all other of the transverse walls 43 and returns them to their normal inclined ice block freezing position in the unitary structure. The normal biasing effect produced by spring means 57 against projection 56 on wall 41 is thereafter sufficient to hold the transverse walls in their inclined position against being shifted therefrom during the act of filling tray 26 with water and transporting same from the kitchen sink to a freezing chamber of a refrigerator cabinet. As a result of such automatic return and holding of parts of the grid in their ice block freezing position within tray 26 the hook-like end 44 on the grid wall actuating member 42 is maintained in a predetermined proper location with respect to other portions of the unitary freezing device structure whereby it will register with and be received by a part of the movable mechanism on an ice block ejecting apparatus which is common to all of a plurality of non-lever carrying freezing devices used in a household refrigerator cabinet.

In view of the foregoing it should be apparent that we have provided an improved unitary freezing device structure the registering part of the grid wall actuating member of which is insured of being in proper position to be received by a part of an ice block ejecting apparatus when the device is placed into association therewith. Our invention eliminates difficulties encountered in the use of a unitary freezing device structure having movable grid walls locked in the tray thereof and renders the same infallible when ice blocks are to be released therefrom. In addition the slight movement of one end of the grid away from the tray bottom in our improved freezing device augments the release or ejection of ice blocks therefrom. Furthermore the single spring means employed in our freezing device can be quickly and easily replaced should it become broken or ineffective to return and hold the grid walls in their normal ice block freezing position.

While the form of embodiment of the invention as herein disclosed constitutes a preferred form, it is to be understood that other forms might be adopted, as may come within the scope of the claims which follow.

What is claimed is as follows:

1. A freezing device comprising in combination, an elongated tray, a grid within said tray, said grid including a longitudinal wall, a substantially co-extensive actuating member thereabove and a plurality of spaced apart walls extending transversely thereacross and interlocked therewith for movement relative thereto and to said tray, said transverse walls being normally inclined with respect to the vertical and cooperating with said longitudinal wall to divide the interior of said tray into rows of compartments in which water is to be frozen into ice blocks, means for locking said grid in said tray against detachment therefrom to provide a unitary freezing device structure, said locking means including a spring interposed between a part of said grid and a portion of said tray at one end of said unitary freezing device structure biasing walls of the grid into contact with the bottom of the tray, said actuating member being movable in one direction lengthwise along said longitudinal grid wall and engageable with each of said inclined transverse walls to tilt them toward the vertical for breaking bonds between ice blocks in said device and their compartment walls, cam means in the vicinity of said one end of said freezing device responsive to the movement of said actuating member for moving said part of said grid at said one end of said device away from said tray bottom while said locking means retains the grid locked in the tray, and the biasing effect of said spring being increased automatically in response to moving said part of said grid away from said tray bottom for causing said cam means to shift said actuating member in a direction opposite said one direction of movement thereof whereby it reengages said transverse grid walls and returns them to their normal inclined position.

2. A unitary freezing device structure as defined by claim 1 wherein the actuating member is constructed to engage the transverse grid walls one after the other in succession to progressively tilt them toward the vertical from end to end of the device.

3. A freezing device comprising in combination, an elongated tray, a grid within said tray, said grid including a longitudinal wall, a substantially coextensive actuating member thereabove and a plurality of spaced apart walls extending transversely thereacross and interlocked therewith for movement relative thereto and to said tray, said transverse walls being normally inclined with respect to the vertical and cooperating with said longitudinal wall to divide the interior of said tray into rows of compartments in which water is to be frozen into ice blocks, means for locking said grid in said tray against detachment therefrom to provide a unitary freezing device structure, said locking means including a projection on an end of said longitudinal wall extending through an opening in an upright end of said tray at one end of said unitary structure, a compressible spring means interposed between said projection on the longitudinal wall and portions of said tray adjacent the opening in its upright end biasing the walls of said grid into contact with the bottom of the tray, said actuating member being movable in one direction lengthwise along said longitudinal grid wall and engageable with each of said inclined transverse walls to tilt them toward the vertical for breaking bonds between ice blocks in said device and their compartment walls, cam means incorporated in the grid in the vicinity of said one end of said freezing device, said cam means being responsive to the movement of said actuating member for moving a part of said longitudinal grid wall at said one end of said device away from said tray bottom while said locking means retains the grid locked in the tray, and said spring means being compressed automatically in response to moving said part of said longitudinal grid wall away from said tray bottom for increasing its biasing effect and causing said cam means to shift said actuating member in a direction opposite said one direction of movement thereof whereby it reengages said transverse grid walls and returns them to their normal inclined position.

4. A unitary freezing device structure as defined by claim 3 wherein the actuating member is constructed to engage the transverse grid walls one after the other in succession to progressively tilt them toward the vertical from end to end of the device.

5. A freezing device comprising in combination, an elongated tray, a grid within said tray, said grid including a longitudinal wall, a substantially coextensive actuating member thereabove and a plurality of spaced apart walls extending transversely thereacross and interlocked therewith for movement relative thereto and to said tray, said transverse walls being normally inclined with respect to the vertical and cooperating with said longitudinal wall to divide the interior of said tray into rows of compartments in which water is to be frozen into ice blocks, means for locking said grid in said tray against detachment therefrom to provide a unitary freezing device structure, said locking means including a projection on an end of said longitudinal wall extending through an opening in an upright end of said tray at one end of said unitary structure, a compressible spring means interposed between said projection on the longitudinal wall and portions of said tray adjacent the opening in its upright end biasing the walls of said grid into contact with the bottom of the tray, said actuating member being movable in one direction lengthwise along said longitudinal grid wall and engageable with each of said inclined transverse walls to tilt them toward the vertical for breaking bonds between ice blocks in said device and their compartment walls, the one traverse grid wall adjacent said one end of said freezing device being provided with a lip extending laterally from its lower edge under said longitudinal wall, said lip being rotatable with the tilting of said one transverse wall by said actuating member for moving an end of said longitudinal grid wall away from said tray bottom while the locking means retains the grid locked in the tray, and said spring means being compressed automatically in response to the movement of said end of said longitudinal grid wall away from said tray bottom for increasing its biasing effect to move said end of said longitudinal grid wall back into contact with said tray bottom whereby said longitudinal wall acts on said lip to cam said one transverse wall toward its normal inclined position and shift said actuating member in a direction opposite its said one direction of movement to return all other of the plurality of transverse grid walls to their normal inclined position.

6. A unitary freezing device structure as defined by claim 5 wherein the actuating member is constructed to engage the transverse grid walls one after the other in succession to progressively tilt them toward the vertical from end to end of the device.

7. A freezing device comprising in combination, an elongated tray having a rim bordering the top thereof, a grid within said tray, said grid including a longitudinal wall, a substantially coextensive actuating member thereabove and a plurality of spaced apart walls extending transversely thereacross and interlocked therewith for movement relative thereto and to said tray, said transverse walls being normally inclined with respect to the vertical and cooperating with said longitudinal wall to divide the interior of said tray into rows of compartments in which water is to be frozen into ice blocks, means for locking said grid in said tray against detachment therefrom to provide a unitary freezing device structure, said locking means including a projection on an end of said longitudinal grid wall extending through an opening in an upright end of said tray at one end of said unitary structure, a spring interposed between said projection on the longitudinal wall and the under side of said tray rim adjacent the opening in its upright end biasing the walls of said grid into contact with the bottom of the tray, said actuating member being movable in one direction lengthwise along said longitudinal grid wall and engageable with each of said inclined transverse walls to tilt them toward the vertical for breaking bonds between ice blocks in said device and their compartment walls, means incorporated in the grid and responsive to movement of said actuating member for moving an end of said longitudinal grid wall at said one end of said device away from said tray bottom while said locking means retains the grid locked in the tray, and said spring being compressed automatically in response to moving said end of said longitudinal grid wall away from said tray bottom for increasing its biasing effect and causing said last named means to shift said actuating member in a direction opposite said one direction of movement thereof whereby it reengages said transverse grid walls and returns them to their normal inclined position.

8. A unitary freezing device structure as defined by claim 7 wherein the actuating member is constructed to engage the transverse grid walls one after the other in succession to progressively tilt them toward the vertical from end to end of the device.

9. A freezing device comprising in combination, a tray, a grid within said tray including a plurality of walls normally inclined with respect to the vertical and dividing the interior of said tray into compartments in which water is to be frozen into ice blocks, said grid also including a grid wall actuating member extending across said grid walls and movably interlocked therewith, means for locking said grid in said tray against detachment therefrom to provide a unitary structure, said locking means including a spring interposed between an end part of said grid and a portion of said tray at one end of said unitary structure biasing said grid walls into contact with the bottom of said tray, said actuating member being movable in one direction for engaging each of said inclined grid walls and tilting them toward the vertical to break bonds between ice blocks and their compartment walls, means incorporated in the grid for moving said part thereof at said one end of said structure away from said tray bottom while said locking means retains the grid locked in the tray, and said spring being rendered effective by moving said end part of said grid away from said tray bottom for moving the end part of said grid back into contact with the tray bottom, after removing ice blocks from said unitary freezing device structure, to cause said means to shift said grid wall actuating member in a direction opposite said one direction of movement thereof whereby it reengages said grid walls and returns them to their normal inclined position.

10. A freezing device as defined by claim 9 wherein the actuating member is constructed to engage the grid walls one after the other in succession to progressively tilt them toward the vertical from end to end of the device.

11. A freezing device comprising in combination, a tray, a grid within said tray including a plurality of walls normally inclined with respect to the vertical and dividing the interior of said tray into compartments in which water is to be frozen into ice blocks, said grid also including a grid wall actuating member extending across said inclined walls and being movably interlocked therewith, means for locking said grid in said tray against detachment therefrom to provide a unitary structure, a spring interposed between an end part of said grid and a portion of said tray at one end of said unitary structure, said actuating member being movable in one direction for engaging said inclined walls and tilting them toward the vertical to break bonds between ice blocks and their compartment walls, means incorporated in said unitary structure and operable upon tilting said grid walls for moving at least the end part of said grid at said one end of the structure away from the bottom of said tray while said locking means retains the grid locked in the tray, and said spring being rendered effective by moving said end part of said grid away from said tray bottom to cause said means to shift said actuating member in a direction opposite said one direction of movement thereof whereby it reengages said grid walls and tilts them back into their normal inclined position.

References Cited in the file of this patent

UNITED STATES PATENTS

| 2,253,126 | Keiper | Aug. 19, 1941 |
| 2,619,807 | Ezba | Dec. 2, 1952 |
| 2,622,410 | Roberts | Dec. 23, 1952 |
| 2,724,244 | Jands | Nov. 22, 1955 |